US005604332A

United States Patent [19]

Ikeda et al.

[11] Patent Number: 5,604,332

[45] Date of Patent: Feb. 18, 1997

[54] CIRCUIT INSULATING PLATE

[75] Inventors: Hiroki Ikeda; Teruyuki Kitahara, both of Yokkaichi, Japan

[73] Assignee: Sumitomo Wiring Systems, Ltd., Yokkaichi, Japan

[21] Appl. No.: 283,942

[22] Filed: Aug. 1, 1994

[30] Foreign Application Priority Data

Aug. 9, 1993 [JP] Japan .................................... 5-043549

[51] Int. Cl.$^6$ ........................................................ H02G 5/08

[52] U.S. Cl. ........................................ 174/138 R; 439/544

[58] Field of Search ............................... 174/138 R, 68.2, 174/70 B, 71 B, 72 B, 88 B, 99 B, 129 B, 133 B; 439/74, 544, 547, 550

[56] References Cited

U.S. PATENT DOCUMENTS 4,781,600 11/1988 Sugiyama et al. ........................ 439/45
4,781,621 11/1988 Sugiyama et al. ....................... 439/559
5,067,905 11/1991 Matsumoto et al. ....................... 439/76
5,357,142 10/1994 Kubota et al. ...................... 361/641 X
5,442,135 8/1995 Faulkner et al. ....................... 174/68.2

*Primary Examiner*—Kristine L. Kincaid
*Assistant Examiner*—Paramita Ghosh
*Attorney, Agent, or Firm*—Greenblum & Bernstein, P.L.C.

[57] ABSTRACT

A circuit insulating plate is interposed between neighboring ones of bus bars provided in stages in an electrical connection box. A portion, which confronts a plurality of tabs projecting at a short interval from one of the neighboring ones of the bus bars, includes a through-opening having a large area such that the tabs are passed through the through-opening. A rib extends along a peripheral edge of the through-opening, and the area is set so that the rib fits closely within a through-opening of an adjacent circuit insulating plate.

2 Claims, 3 Drawing Sheets

CIRCUIT INSULATING PLATE

BACKGROUND OF THE INVENTION

The present invention generally relates to a circuit insulating plate disposed in an electrical connection box such as a relay box, a junction box, etc. and more particularly, to a circuit insulating plate which is interposed between neighboring ones of bus bars provided in stages in an electrical connection box for connecting, through branching, wiring harnesses installed in a motor vehicle so as to insulate the neighboring ones of the bus bars.

Conventionally, in an electrical connection box, a bus bar, which forms a branch circuit and is made of an electrically conductive metal, is accommodated. However, since a circuit which can be formed on a small area of the bus bar is limited, a plurality of the bus bars are provided in stages through circuit insulating plates in the electrical connection box.

For example, as shown in FIG. 1, a circuit insulating plate 2A made of electrically insulative resin is interposed between upper and lower bus bars 1A and 1B and a circuit insulating plate 2B is piled on the upper bus bar 1A such that the bus bars 1A and 1B and the circuit insulating plates 2A and 2B are accommodated in an electrical connection box (not shown). A plurality of tabs 3 project upwardly from a specific edge of each of the bus bars 1A and 1B. A plurality of through-holes 4 for passing the tabs 3 of the lower bus bars 1B therethrough are formed on the circuit insulating plate 2A, while a plurality of through-holes 4 for passing the tabs 3 of the upper and lower bus bars 1A and 1B are formed on the circuit insulating plate 2B. The tabs 3 projecting from the circuit insulating plate 2B via the through-holes 4 are electrically connected to terminals or relay terminals of a connector mounted on the electrical connection box.

As described above, each of the tabs provided on the bus bars should be passed through each of the through-holes of the circuit insulating plates such that the bus bars and the circuit insulating plates are assembled with each other.

However, since the number of electric devices used for motor vehicles is increasing recently, a number of the wiring harnesses are connected to the electrical connection box. As a result, the number of the bus bars provided in stages in the electrical connection box is on the increase and naturally, the number of the tabs of the bus bars is also increasing sharply.

Therefore, in the known electrical connection box, it is quite time-consuming to pass each tab through each through-hole. Especially, in case the tab is formed by a thin tab having small conductive capacity, such a problem arises that the tab is not aligned with the through-hole accurately and thus, is readily bent or buckled when subjected to an external force. Once the tab has been bent or buckled as described above, reliability of contact of the tab with a mating terminal drops, thereby resulting in deterioration of quality and performance of the electrical connection box.

SUMMARY OF THE INVENTION

Accordingly, an essential object of the present invention is to provide, with a view to eliminating the above described drawbacks of conventional electrical connection boxes, a circuit insulating plate for an electrical connection box having bus bars disposed in stages, which passes therethrough tabs extending from some of the bus bars disposed below the circuit insulating plate and is interposed between neighboring ones of the bus bars so as to positively insulate the neighboring ones of the bus bars.

In order to accomplish this object of the present invention, a circuit insulating plate which is interposed between neighboring ones of bus bars provided in stages in an electrical connection box, according to the present invention comprises: a portion which confronts a plurality of tabs projecting at a short interval from one of the neighboring ones of the bus bars and is formed with a through-opening having a large area such that the tabs are passed through the through-opening.

It is preferable that the through-opening is formed at the portion of the circuit insulating plate, which confronts a plurality of densely provided thin tabs having small conductive capacity. Meanwhile, a reinforcement rib is formed along a peripheral edge of the through-opening of the circuit insulating plate.

When the circuit insulating plates and the bus bars are piled on one another, a plurality of the densely provided tabs of the bus bars can be inserted through the through-opening of the circuit insulating plate at a time. Therefore, the tabs can be inserted through the through-opening easily and it is possible to prevent damage to the tabs when the tabs are inserted through the through-opening. Consequently, the circuit insulating plate can be suitable for use in a case in which a plurality of thin tabs having small conductive capacity are densely provided at a short interval on the bus bar and are inserted through the through-opening of the circuit insulating plate so as to be connected to a multipolar connector.

BRIEF DESCRIPTION OF THE DRAWINGS

This object and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
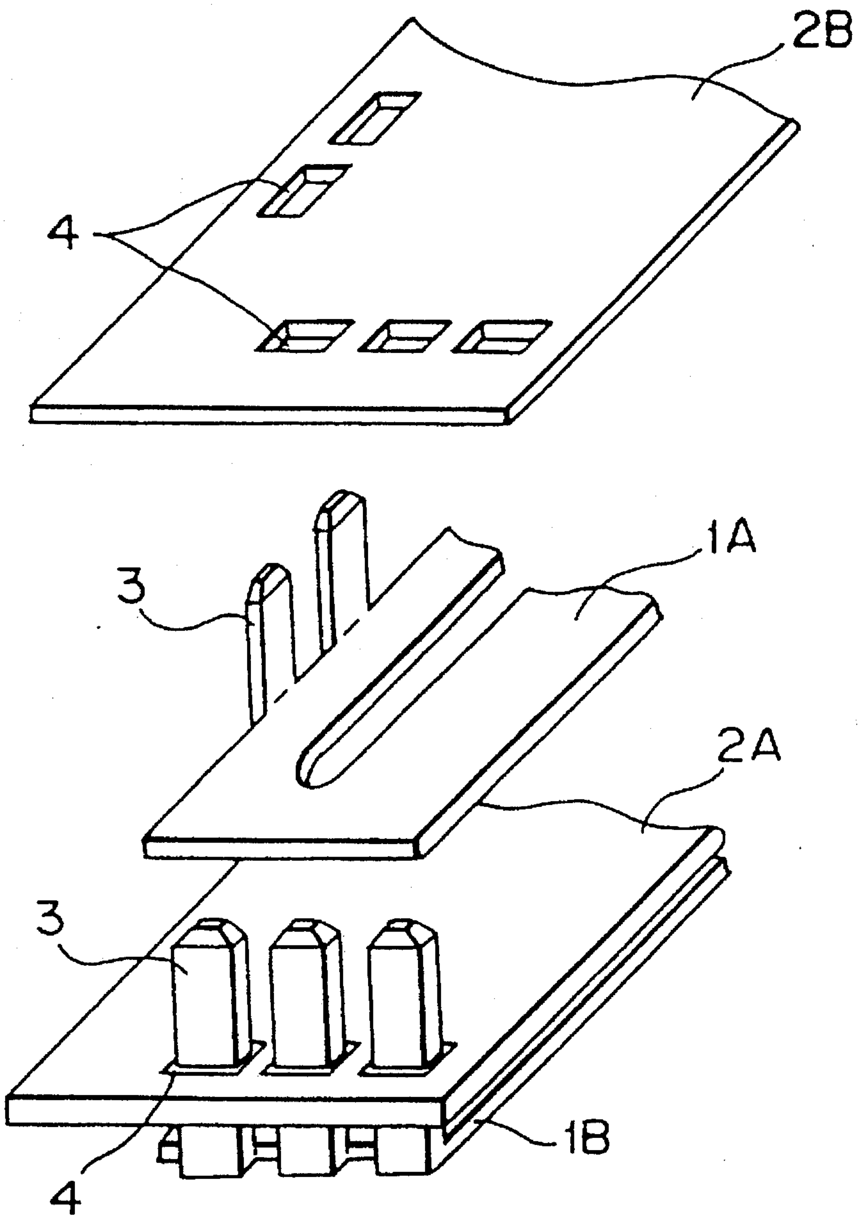
Fig. 1 PRIOR ART
FIG. 1 is a fragmentary exploded perspective view of a prior art electrical connection box (already referred to)
Figure 2:
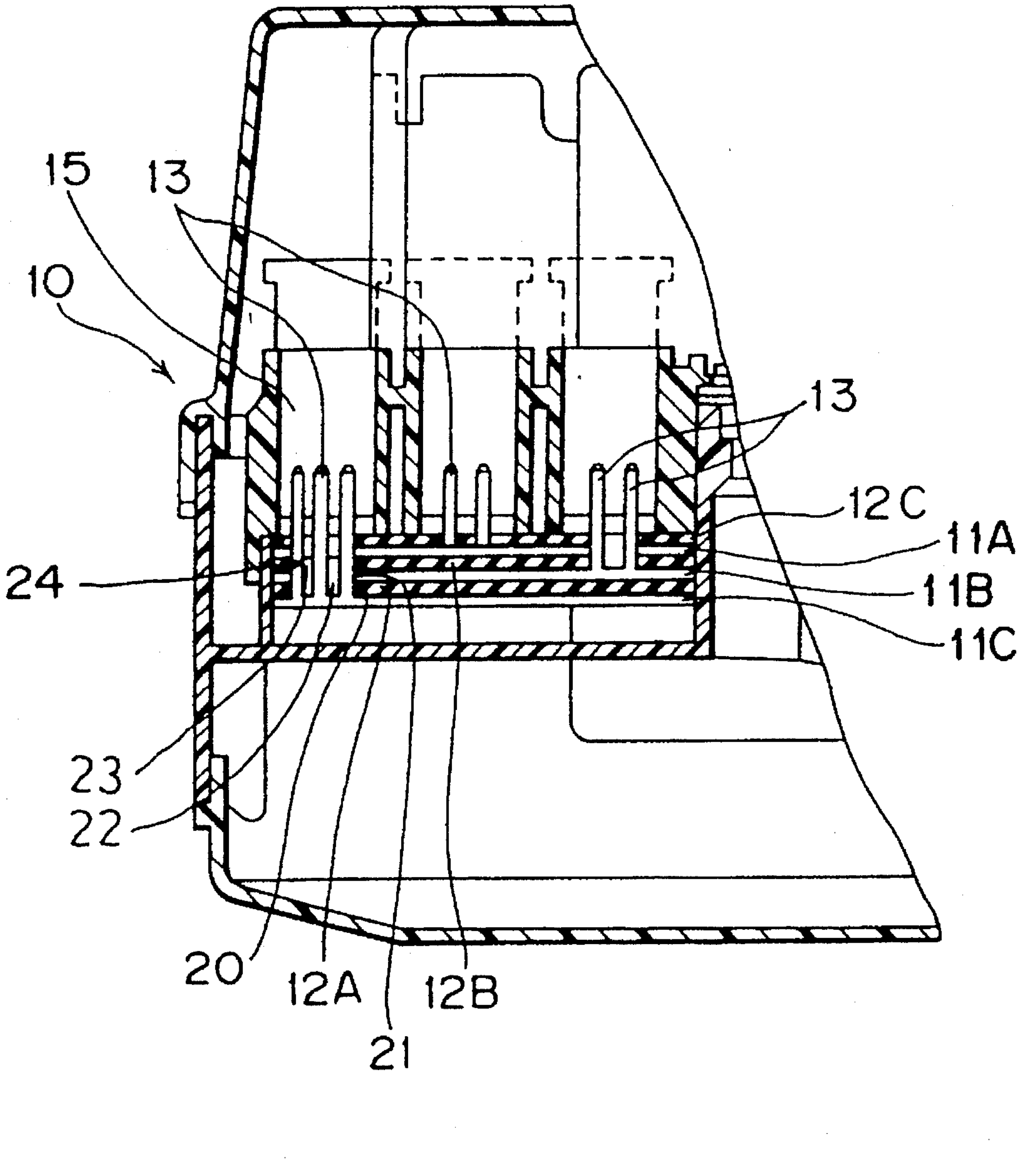
FIG. 2 is a fragmentary sectional view of an electrical connection box according to the present invention.
Figure 3:
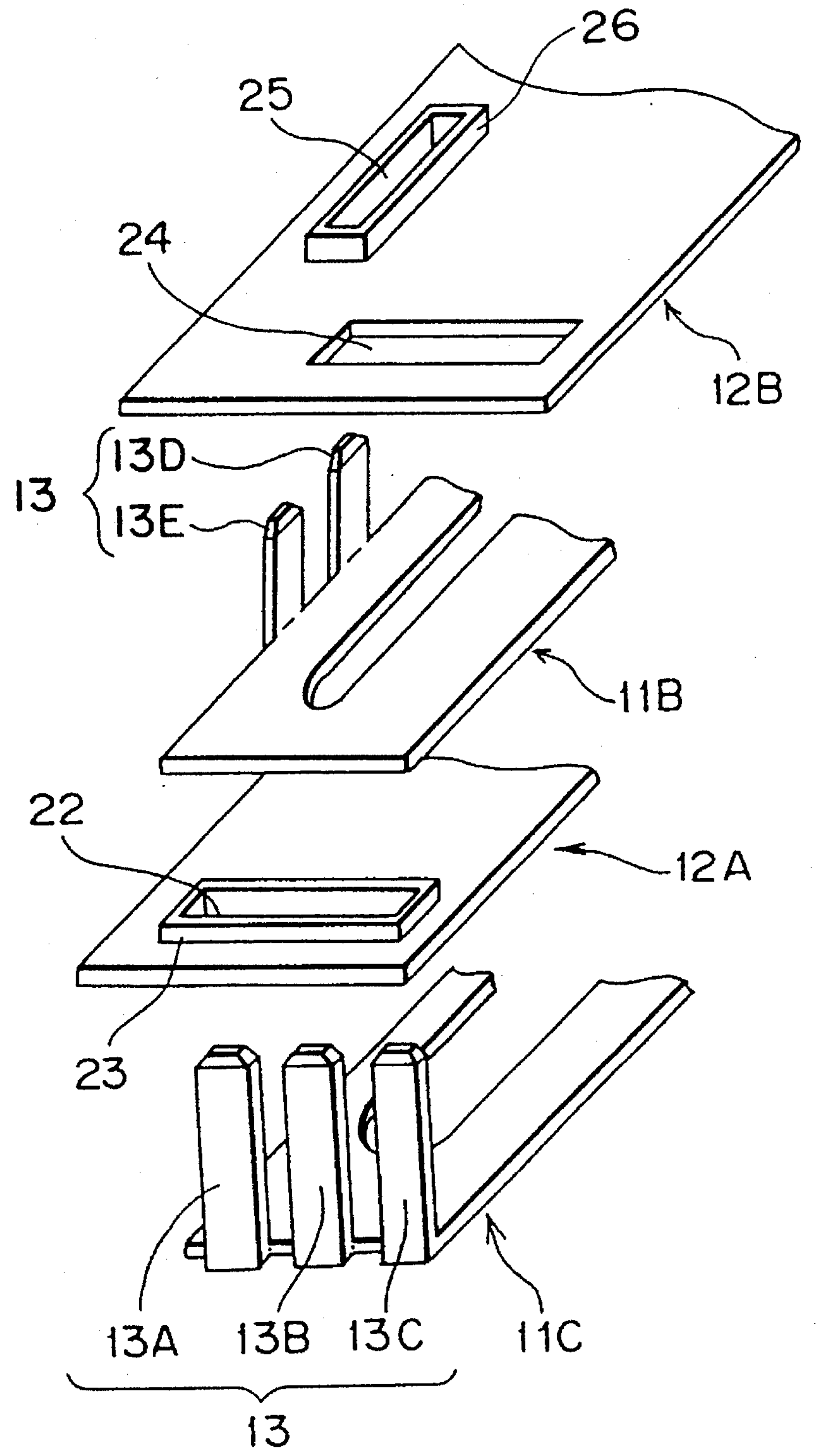
FIG. 3 is a fragmentary exploded perspective view of the electrical connection box of FIG. 2.

Referring now to the drawings, there is shown in FIGS. 2 and 3, an electrical connection box 10 according to one embodiment of the present invention. In the electrical connection box 10, three bus bars 11A, 11B and 11C each made of electrically conductive metal are, respectively, provided in upper, middle and lower stages so as to extend horizontally. Circuit insulating plates 12A and 12B are, respectively, interposed between the bus bars 11B and 11C and between the bus bars 11A and 11B, while a circuit insulating plate 12C is placed on an upper face of the bus bar 11A. The circuit insulating plates 11A to 11C are made of resin.

A plurality of tabs 13 are bent upwardly from predetermined positions of each of the bus bars 11A, 11B and 11C. A hollow 21 is defined by an edge of each of the bus bars 11A and 11B. Through-holes 20 for passing the tabs 13 therethrough are formed on each of the circuit insulating plates 12A, 12B and 12C. Thus, the tabs 13 of each of the bus bars 11A, 11B and 11C are passed, via the hollows 21 of the bus bars 11A and 11B, through the through-holes 20 of some of the circuit insulating plates 12A, 12B and 12C disposed above each of the bus bars 11A, 11B and 11C and are projected into a connector 15 disposed above the circuit insulating plate 12C so as to be connected to terminals (not shown) mounted in the connector 15.

Without passing through the through-holes 20, respectively a plurality of the tabs 13 disposed adjacent to each other, the through-holes 20 are combined into a large through-opening. Namely, when a portion of one of the circuit insulating plates 12A, 12B and 12C confronts a plurality of the tabs 13 disposed adjacent to each other, the large through-opening capable of passing a plurality of the tabs 13 therethrough is formed at the portion of the one of the circuit insulating plates 12A, 12B and 12C.

More specifically, as shown in FIG. 3, since the tabs 13A, 13B and 13C projecting from an edge of the bus bar 11C in close vicinity to each other confront a portion of the circuit insulating plate 12A interposed between the bus bars 11B and 11C, a rectangular through-opening 22 for passing tabs 13A, 13B and 13C therethrough is formed at the portion of the circuit insulating plate 12A. Furthermore, an upwardly projecting rib 23 extends along a peripheral edge of the through-opening 22.

Meanwhile, a rectangular through-opening 24 for passing the tube 13A, 13B and 13C of the bus bar 11C therethrough is likewise formed on the circuit insulating plate 12B interposed between the bus bars 11A and 11B and a rectangular through-opening 25 for passing tabs 13D and 13E of the bus bar 11B therethrough is formed on the circuit insulating plate 12B. In addition, a rib 26 extends along a peripheral edge of the through-hole 25. Although not specifically shown, rectangular through-openings corresponding to the through-openings 24 and 25 of the circuit insulating plate 12B are formed on the circuit insulating plate 12C.

In FIG. 3, the through-opening 24 of the circuit insulating plate 12B is set at such a dimension that the rib 23 of the circuit insulating plate 12A is closely fitted into the through-opening 24. Therefore, when the bus bar lib is interposed between the circuit insulating plates 12A and 12B, the bus bar 11B is brought into close contact with an upper face of the circuit insulating plate 12A and a lower face of the circuit insulating plate 12B.

When the bus bars 11A, 11B and 11C are assembled with the circuit insulating plates 12A, 12B and 12C, the tabs 13 projecting from the bus bars 11A, 11B and 11C in close vicinity to each other can be collectively passed through the through-openings 22, 24 and 25 of the circuit insulating plates 12A, 12B and 12C disposed above some of the bus bars 11A, 11B and 11C. Therefore, insertion of the tabs 13 through the through-holes is facilitated quite remarkably.

Furthermore, since the through-openings 22, 24 and 25 have large areas, such a phenomenon does not take place that the tabs 13 are bent or buckled by forcibly inserting the tabs into the through-holes. As a result, the tabs 13 can be protected against damage.

Especially, the tabs projecting from the bus bar in close vicinity to each other are often thin tabs having small conductive capacity and connected to one multipolar connector. Such tabs are likely to sustain damage such as bending even if a small external force is applied to the tabs.

However, in the present invention, since these tabs 13 are inserted through the through-openings 22, 24 and 25 having large areas, the tabs 13 are least likely to be bent desirably.

As is clear from the foregoing description of the circuit insulating plate of the present invention, since the circuit insulating plate is formed with the large through-openings capable of collectively passing there-through the tabs projecting from the bus bars in close vicinity to each other, efficiency for assembling the circuit insulating plate with the bus bars is improved.

Meanwhile, conventionally, since a through-hole for inserting one tab therethrough is so formed as to be slightly larger than the tab, such an inconvenience is encountered that if the tab is inaccurately positioned for inserting the tab through the through-hole, the tab is likely to be bent or buckled. On the contrary, in the present invention, since the circuit insulating plate is formed with the through-opening for passing therethrough the tabs projecting from the bus bar in close vicinity to each other, such a case seldom happens in which the tabs are bent or buckled through their interference with a peripheral edge of the through-opening. As a result, the tabs can be protected against damage. Since the tabs are not bent or buckled as described above, reliability of connection of the tabs to the connector is improved advantageously.

What is claimed is:

1. A circuit insulating plate which is interposed between neighboring ones of bus bars provided in stages in an electrical connection box, the circuit insulating plate comprising:

a portion which confronts a plurality of tabs projecting at a short interval from one of the neighboring ones of the bus bars, the portion including a through-opening having a large predetermined area such that the plurality of tabs are passed through the through-opening; and a rib extending along a peripheral edge of the through-opening, the predetermined area being set so that the rib fits closely within a through-opening of an adjacent circuit insulating plate, whereby the one of the neighboring ones of the bus bars therebetween is securely gripped.

2. A circuit insulating plate assembly comprising:

at least two bus bars, each of said bus bars including a plurality of tabs projecting therefrom;

at least two circuit insulating plates, one of the at least two insulating plates being interposed between neighboring ones of the at least two bus bars, and another of the at least two insulating plates being located at an outer face of one of the at least two bus bars, each circuit insulating plate including at least one through-opening having a large predetermined area such that the plurality of tabs are passed through the through-opening; and a rib extending along a peripheral edge of said at least one through-opening in one of the at least two insulating plates, the predetermined area being set so that the rib fits closely within the of least one through-opening in the another of the at least two insulating plates, whereby the one of the at least two bus bars between the at least two circuit insulating plates is securely gripped.

* * * * *

UNITED STATES PATENT AND TRADEMARK OFFICE
CERTIFICATE OF CORRECTION

PATENT NO. : 5,604,332

DATED : February 18, 1997

INVENTOR(S) : H. IKEDA et al.

It is certified that error appears in the above-indentified patent and that said Letters Patent is hereby corrected as shown below:

At column 4, line 58 (claim 2, line 15), change "of" to ---at---.

Signed and Sealed this

Eighth Day of July, 1997

Attest:

Bruce Lehman

BRUCE LEHMAN

*Attesting Officer* *Commissioner of Patents and Trademarks*